United States Patent [19]

Owen et al.

[11] 4,164,236
[45] Aug. 14, 1979

[54] VALVE ASSEMBLY WITH SEAT CLEANING SYSTEM

[76] Inventors: Marler W. Owen, 5503 Valkeith, Houston, Tex. 77096; Ray E. Morris, 803 Holton, Bellaire, Tex. 77401

[21] Appl. No.: 817,549

[22] Filed: Jul. 21, 1977

[51] Int. Cl.² ............................................. F16K 1/226
[52] U.S. Cl. ................................... 137/240; 251/306
[58] Field of Search ............... 137/237, 238, 240, 241; 251/305, 306

[56] References Cited

U.S. PATENT DOCUMENTS

| | | | |
|---|---|---|---|
| 2,705,016 | 3/1955 | Saar | 251/173 X |
| 2,946,554 | 7/1960 | Asker et al. | 251/306 |
| 3,035,598 | 5/1962 | McInerney et al. | 137/240 |
| 3,866,625 | 2/1975 | Kemner et al. | 137/269 |
| 4,032,108 | 6/1977 | Kintner | 251/306 |

Primary Examiner—Martin P. Schwadron
Assistant Examiner—Richard Gerard
Attorney, Agent, or Firm—Browning, Bushman & Zamecki

[57] ABSTRACT

A valve assembly comprising a valve body having a flowway therethrough and a seating surface extending radially into the flowway from the valve body. A disc type valve element has a sealing area engageable with the seating surface and is mounted in the flowway for movement of the sealing area toward and away from the seating surface. A fluid passageway extends through the valve body and includes inlet means opening externally of the valve body and outlet means opening internally of the valve body and generally radially into the flowway and positioned such that a fluid may be directed against the seating surface through the fluid passageway.

8 Claims, 2 Drawing Figures

VALVE ASSEMBLY WITH SEAT CLEANING SYSTEM

BACKGROUND OF THE INVENTION

1. Field of the Invention

The present invention relates to disc type valve assemblies. Although not limited thereto, the invention is particularly adapted to damper valves which are used in environments in which a tight leakproof seal between the valve element and valve seat is imperative.

For example, in tankers used to transport oil and other flammable liquids, an inert gas is customarily used to fill the air space above the liquid level of the flammable liquid in order to prevent explosions. A convenient source of such inert gas is the exhaust from the diesel engines of the vessel, and such is conveyed to the storage vessels via suitable conduits. It is periodically necessary to close these conduits to permit maintenance work on filters or other apparatus therein, or on the conduits themselves. Closing of the conduits is customarily accomplished by damper valves in the conduits.

During such maintenance periods, it is imperative that a tight leakproof seal be maintained by the damper valve to prevent leakage of the inert gas and asphyxiation of the workers. However, during such times as the valve is open, solids tend to build up on the valve seat, and these deposits interfere with the effectiveness of the seal between the valve element and the seat.

2. Description of the Prior Art

Several techniques have been attempted in dealing with the aforementioned problem of solid deposits on valve seats. One is the provision of hollow valve elements having jets for the direction of air onto the valve seat to clear the latter. In another system, such jets are provided in the pipes and/or flanges between which the valve is disposed and directed at the valve element. Neither of these techniques has been satisfactory.

SUMMARY OF THE INVENTION

The valve assembly of the present invention is of the disc type and comprises a valve body having a flowway therethrough and means defining a seating surface extending generally radially into the flowway from the valve body. A disc-like valve element has a sealing area engageable with the seating surface and is mounted in the flowway for movement of the sealing area toward and away from the seating surface. Means are provided defining a fluid passageway through the valve body and including inlet means opening externally of the valve body and outlet means opening internally of the valve body and generally radially into the flowway. The inlet means is positioned such that a suitable fluid may be directed against the seating surface through the fluid passageway to clean the seating surface prior to closing of the valve. The sealing area of the valve element is thereby permitted to directly and tightly engage the seating surface and form a leakproof seal.

Although the invention may be advantageously applied to any disc valve of the type described above, it is especially well adapted to damper valves of the butterfly type in which the valve element is rotatably mounted in the valve flowway for movement about an axis transverse to the flowway. An annular rib extends radially into the flowway from the valve body, and two substantially semi-annular seating surfaces are defined each on a respective one of the axially directed sides of the rib. The two seating surfaces are also disposed on opposite sides of the axis of rotation of the valve element.

The valve element likewise has two sealing areas, each substantially semi-annular and each formed on a respective one of the faces of the disc. The sealing areas are disposed on opposite sides of the axis of rotation to engage respective ones of the seating surfaces. Thus the rib constrains the valve element to open in one direction only. Since the two seating surfaces are discontinuous, two fluid passageways may advantageously be provided for cleaning respective ones of the seating surfaces.

In the preferred embodiments of the invention, the outlet means of the fluid passageway is defined by a plurality of ports circumferentially spaced along the seating surface. These ports open generally radially into the flowway and are preferably, axially inclined toward the seating surface.

Accordingly, it is a principal object of the present invention to provide a valve assembly having fluid passageways in the valve body for cleaning the valve seat.

Another object of the invention is to provide a disc type valve having means to ensure the quality of the seal formed at the valve seat.

Still another object of the invention is to provide an improved damper valve of the butterfly type.

Other objects, features and advantages of the invention will be made apparent by the following description of the preferred embodiment, the drawings, and the claims.

DESCRIPTION OF THE PREFERRED EMBODIMENT

Figure 1:
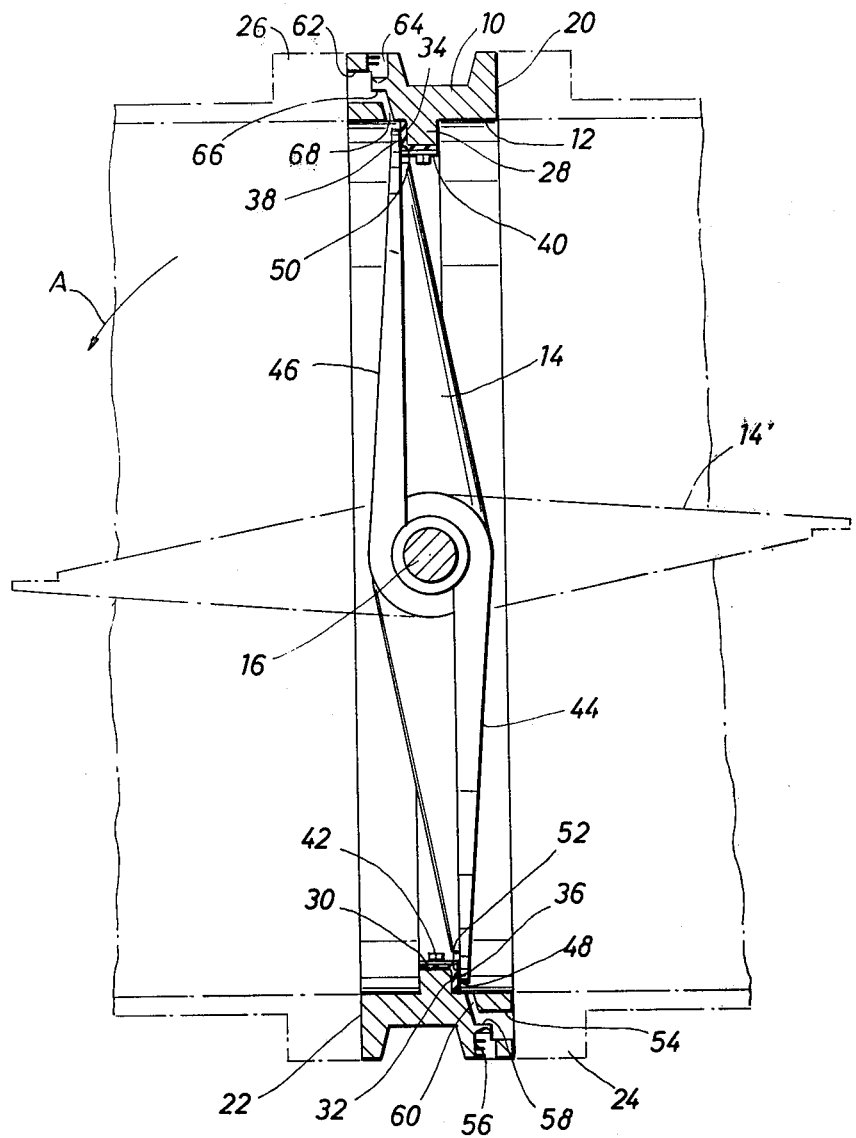
FIG. 1 is a longitudinal cross-sectional view of a valve according to the invention.
Figure 2:
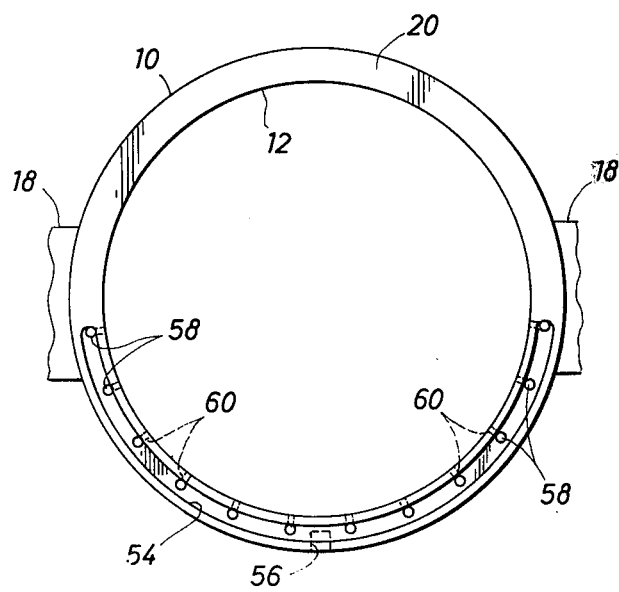
FIG. 2 is an end elevational view of the valve body with the rib portion and trunnions broken away.

Referring now to the drawings, there is shown a valve according to the invention comprising a cylindrical valve body 10 having a central flowway 12 therethrough. Unless otherwise specified, terms such as "radial," "circumferential," "axial," etc., as used herein should be construed with respect to the valve body 10 and its flowway 12. A disc shaped valve element 14 is mounted in the flowway 12 on a shaft 16 which extends transversely through the flowway 12 and has its ends rotatably mounted in trunnions 18 formed integrally with the valve body 10 and extending radially outwardly therefrom or in any other suitable manner. Such rotary mounting means are well known in the art and per se form no part of the invention.

The valve body 10 has oppositely axially directed end surfaces 20 and 22 adapted to be engaged by respective flange fittings 24 and 26 whereby the valve may be mounted in a conduit. The valve body 10 also includes an annular rib 28 extending radially into the flowway 12 from the main portion of the valve body. An elastomeric valve seat member is mounted on the rib 28. The valve seat comprises an annular base portion 30 which overlies the radially inner surface of the rib 28 and a pair of substantially semi-annular lips 32 and 34 which overlie substantially semi-annular portions of respective sides of the rib 28. The lips 32 and 34 are also positioned on opposite sides of the axis of the shaft 16 and define respective substantially semi-annular seating surfaces 36 and 38 extending radially into the flowway 12. A metal retainer ring 40 overlies the base portion 30 of the valve seat. A plurality of screws 42 extending through the retainer ring 40 and base 30 into the valve body 10 serve to clamp the valve seat in place via the ring 40.

The valve element 14 comprises a pair of oppositely directed generally circular faces 44 and 46 interconnected by an annular edge portion 48. Each face 44 and 46 has a respective substantially semi-annular sealing area 50 or 52 formed thereon adjacent the edge portion 48. Since the sealing areas 50 and 52 are disposed on opposite sides of the axis of the shaft 16, and the diameter of the disc 14 is greater than the inner diameter of rib 28, each of the sealing areas 50 and 52 is engageable with a respective one of the seating surfaces 38 and 36 when the valve element 14 is in the closed position illustrated in solid lines in FIG. 1. By rotation of the valve element on the shaft 16 in the direction of arrow A, it may be moved to an open position illustrated in phantom at 14'. Reverse rotation, of course, closes the valve, and during such movements the sealing areas 50 and 52 are moved toward and away from the respective seating surfaces 38 and 36. Since the seating surfaces 36 and 38 are substantially semi-annular and are positioned on opposite sides of the axis of rotation of the valve element 14 and its shaft 16, and since the sealing areas 52 and 50 are likewise disposed on opposite sides of the axis, the engagement of the sealing areas 50, 52 with the respective seating surfaces 38, 36 when the valve is closed provides a seal about substantially the entire circumference of the valve element 14.

In order to provide for removal of solids which may build up on the seating surfaces 36,38 when the valve is open, two fluid passageways are provided in the valve body 10, each for cleaning a respective one of the seating surfaces. The fluid passageway for the seating surface 36 includes a semi-annular recess 54 extending axially into the end surface 20 of the valve body and disposed parallel to the semi-annular seating surface 36. The inlet of the passageway is defined by a threaded bore 56 extending radially into the valve body from its exterior and intersecting the recess 54. The outlet means for the passageway is defined by a plurality of outlet passages each intersecting the recess 54 and circumferentially spaced from one another therealong. Each of the outlet passages is generally L-shaped in configuration and comprises a first leg 58 extending axially inwardly from the recess 54 and a second leg 60 extending from leg 58 into the flowway 12. Although the legs 60 open generally radially into the flowway 12, they are also slightly axially inclined toward the seating surface 36. Thus the legs 60 serve as outlet ports.

When the valve body is mounted between the flange fittings 24 and 26, fitting 24 covers and closes the recess 54 except for its communications with bore 56 and passages 58, 60. A threaded connector, having a hose or other conduit attached thereto, may be inserted into the bore 56 to introduce an inert cleaning fluid, such as stream or an inert gas into the fluid passageway. This fluid is jetted through the ports 60 against the seating surface 36 to clean away any solid deposits thereon prior to closing of the valve. Thus when the valve element 14 is closed, sealing area 52 may properly engage seating surface 36 to form a fluid tight or leakproof seal.

The fluid passageway for the seating surface 38 is substantially identical to that for surface 36. In particular, it includes a substantially semi-annular recess 62 in end surface 22 of the valve body on the opposite side of the shaft axis from recess 54, i.e., positioned parallel to surface 38. The passageway also includes a threaded inlet bore 64 and outlet passages each having an axially extending leg 66 and a generally radially extending leg 68.

From the foregoing discussion, it can be seen that the present invention provides a disc type valve with self-cleaning means for the valve seating surfaces. Such self-cleaning means permit the removal of solid deposits on these surfaces so that a fluid tight seal may be maintained thereon. By continuing to supply a harmless fluid to the fluid passageway when the valve is closed, it is possible to wash the more dangerous fluid away from the valve and assure that any leakage which does occur is of the harmless fluid.

It can also be appreciated that numerous modifications of the preferred embodiment described above can be made without departing from the spirit of the invention. For example, as mentioned above, the seating surfaces of the embodiment above extend radially into the valve flowway, and the outlet ports open generally radially but are axially inclined toward the seating surfaces. However, other orientations are possible so long as the outlets are positioned such that fluid emanating therefrom will impinge on the seating surface. Also, while the invention is particularly described as it would be incorporated in a butterfly type disc valve, i.e., one having a rotary valve element, it could also be applied to other types of disc valves. Other modifications might involve changes in the configuration of the fluid passageway. It is thus intended that the scope of the invention be limited only by the claims which follow.

We claim:

1. A valve assembly comprising:
   a valve body having a flowway therethrough and including oppositely axially directed end surfaces adapted to be engaged by respective mounting fittings;
   means defining a seating surface extending generally radially into said flowway from said valve body;
   a disc-like valve element having a sealing area engageable with said seating surface and mounted in said flowway for movement of said sealing area toward and away from said seating surface;
   and means defining a fluid passageway through said valve body and including an arcuate recess extending axially into one of said end surfaces and positioned to be covered by one of said mounting fittings, inlet means opening externally of said valve body and communicating with said recess, and outlet means communicating with said recess and opening internally of said valve body and generally radially into said flowway and positioned such that a fluid may be directed against said seating surface through said fluid passageway.

2. The valve assembly of claim 1 wherein said valve element comprises a pair of oppositely directed faces and an edge portion interconnecting said faces, said sealing area being disposed on one of said faces adjacent said edge portion.

3. The valve assembly of claim 1 wherein said valve element is rotatably mounted in said flowway for movement about an axis generally transverse to said flowway, wherein there are two such sealing areas each on a respective one of said faces of said valve element, said sealing areas being partially annular in configuration and positioned on generally opposite sides of said axis, wherein there are means defining two such seating surfaces each engageable with a respective one of said sealing areas, and wherein there are two such fluid passageways, each associated with a respective one of said seating surfaces.

4. The valve assembly of claim 3 wherein said valve body includes an annular rib extending radially into said flowway, said seating surfaces being formed on axially opposite sides of said rib.

5. The valve assembly of claim 4 wherein said seating surfaces are defined by resilient seat members disposed on said rib.

6. The valve assembly of claim 1 wherein said inlet means is defined by a bore extending generally radially into said valve body and intersecting said recess.

7. The valve assembly of claim 6 wherein said outlet means is defined by a plurality of ports opening generally radially into said valve body and communicating with said recess, said ports being circumferentially spaced from one another along said recess.

8. The valve assembly of claim 7 wherein said ports are axially inclined toward said seating surface.

* * * * *